United States Patent [19]

Pywell

[11] 4,375,761

[45] Mar. 8, 1983

[54] MONITORING INTERNAL COMBUSTION ENGINES

[75] Inventor: Richard F. Pywell, Ottershaw, England

[73] Assignee: The British Petroleum Company Limited, London, England

[21] Appl. No.: 192,208

[22] Filed: Sep. 30, 1980

[30] Foreign Application Priority Data

Oct. 4, 1979 [GB] United Kingdom ............... 7934567

[51] Int. Cl.³ ..................... G01N 3/56; G01N 23/00
[52] U.S. Cl. .......................................... 73/7; 250/303; 73/120
[58] Field of Search ............ 75/7; 250/303; 73/120, 73/119 R

[56] References Cited

U.S. PATENT DOCUMENTS

| | | | |
|---|---|---|---|
| 2,315,845 | 4/1943 | Ferris | 73/7 X |
| 2,939,011 | 5/1960 | Bisso et al. | 250/303 X |
| 3,101,413 | 8/1963 | Schaschl et al. | 250/303 X |
| 3,678,273 | 7/1972 | Lewis | 250/303 |
| 3,715,593 | 2/1973 | McGunigle | 250/303 |
| 3,797,896 | 3/1974 | Bardach . | |
| 3,818,227 | 6/1974 | Fries . | |
| 3,870,607 | 3/1975 | Bardach . | |

FOREIGN PATENT DOCUMENTS 363894  3/1973  U.S.S.R. ............................. 250/303

*Primary Examiner*—Charles A. Ruehl
*Attorney, Agent, or Firm*—Morgan, Finnegan, Pine, Foley & Lee

[57] ABSTRACT

A method of monitoring the wear of relatively moving parts, particularly inaccessible moving parts of internal combustion engines, comprises fixing a length of radioactive material into the part to be monitored, so that one end of the material is flush with the wearing surface, and measuring the loss of radioactivity as the surface of the part and radioactive material are worn away.

An internal combustion engine having a length of radioactive material fixed into a relatively moving part, as described above, and a radiation detector which may be fitted to the outside of the engine is also claimed.

The method may also be used to measure wear in, for example, pumps or compressors.

7 Claims, No Drawings

MONITORING INTERNAL COMBUSTION ENGINES

This invention relates to a method of monitoring the wear of relatively moving parts, particularly where these parts are not easily accessible. More particularly the invention relates to a method of monitoring the wear of relatively moving parts of internal combustion engines and to engines incorporating the monitoring system.

The ability to measure the wear of engines without dismantling them in an important requirement in the testing of engines, fuels and lubricants, but is also of potential importance for engines in actual service. Marine diesel engines, for example, and other large diesel engines present a particular problem. Estimating the extent of wear is difficult, yet an accurate assessment is desirable to determine the optimum period between overhauls. The difficulties of measuring wear in these large engines has also inhibited the testing of new lubricants by service trials.

Research on measuring wear in marine diesel engines has been carried out in recent years, and a number of methods are described in "The Motor Ship" July 1976, pages 77-80. In addition, methods of measuring the amount of wear using a radioactive source are also known. One such method consists of activating an area of the wearing surface, and measuring the loss of emitted radiation as the activated metal is worn away. However, the activation of the metal cannot, usually, be done in situ which makes it necessary to transport at least part of the engine, the cylinder liners for example, to where the facilities exist to carry out such work. In the case of, for example, cylinder liners from marine diesel engines, this can be very expensive both in terms of the actual transport of the liners and in terms of the length of time for which the vessel is laid up. This method has a further disadvantage in that wear in the wall can only be measured up to a depth of metal of the order of 150 μm.

Another method of measuring wear using a radioactive source comprises locating a radioactive material, such as gaseous Krypton 85, inside the wearing part in such a manner that, when the part reaches a predetermined amount of wear, the radioactive material is released. The increase of measured radioactivity therefore indicates that the predetermined amount of wear has occurred. However the test cannot give an indication of how the rate of wear varies during the test period nor can it indicate the amount of wear which has occurred at any time before or after the release of the radioactive material.

According to the present invention a method of monitoring the wear of relatively moving parts, particularly those parts which are not easily accessible, and more particularly the relative moving parts of internal combustion engines, comprises fixing a length of radioactive material into the part to be monitored, so that one end of the material is flush with the wearing surface, and measuring the loss of radioactivity as the surface of the part and radioactive material are worn away.

Although the method has possible applications for measuring wear in a number of situations, for convenience the rest of this specification will describe the method in relation to its use in internal combustion engines.

The present invention includes an internal combustion engine having a length of radioactive material fixed into a relatively moving part as described above, and a radiation detector which may be fitted to the outside of the engine.

The relatively moving part of the engine is preferably a cylinder wall or liner, but it may be a piston ring. If measuring piston ring wear, it may be necessary to fix the ring to prevent rotation.

The radioactive material is preferably one capable of emitting radiation, particularly γ radiation, of sufficient energy to penetrate a thickness of metal of at least 5 mm and be capable of measurement by a detector thereafter. This is because the radiation detector, which may be, for example, a scintillation detector, is likely, in practice, to be positioned outside the engine. In practice it has been found that radioactive materials can be produced, the radiation of which can be measured through a thickness of up to 80 mm of cast iron.

So that the radioactive material wears at the same rate as the part, it preferably has a hardness which does not exceed that of the metal of the wearing surface, and it is preferably relatively inert with respect to the chemicals contained in the lubricants and fuels used, as well as the metal with which it is in contact.

A radioactive material which has been found to be particularly suitable is cobalt 60 wire. Such wire can be produced to the required levels of activity simply and inexpensively. In particular cobalt 60 wire of 0.1-1.0 mm diameter and activated to between 1 and 20 micro curies per mm has been found suitable.

The length of the material, and the half life of its radioactivity may be selected having regard to the thickness of the part and its likely rate or wear. Preferably they are chosen so that wear can be measured over a relatively long period without replacement of the material. Thus the length may be at least 1 mm and may be up to 5 mm. The half life may be equal to or greater than the intended duration of the monitoring period and may, for example, be greater than or equal to one month.

The material may be located in any part of the wearing surface, but is preferably placed at the position where the greatest amount of wear is anticipated. In the case of an internal combustion engine this is usually at the top of the top piston ring's travel, where a step is often produced in the cylinder wall, or liner, after the engine has been in service for some time. However, the metal thickness, between the wearing surface and the outer surface of the engine where the detector is placed, may be too great at this point to obtain reasonable measurements of the level of radioactivity, using the type of radioactive material described above. In such cases a position further down the stroke may be selected.

The length of radioactive material should be securely fixed in the relatively moving part so that it does not fall out, and so that no wear is produced by relative movement of the material and the part in which it is fixed. A method of locating the material in, for example, a cylinder wall which has proved suitable consists of drilling a slightly oversize hole substantially perpendicular to the wearing surface, and fixing the length of radioactive material into this hole using an acrylic cement. One end of the radioactive material should be made flush with the wearing surface. An acrylic cement found to be particularly useful is Araldite, e.g. Standard Araldite supplied by Ciba Geigy Limited.

Any suitable radiation detector may be used, for example, a scintillation counter with a thallium-activated sodium iodide crystal.

Radioactive material may be fixed into the walls of each cylinder in an engine and by using either one detector for each source or a single movable detector, the relative rates of wear of different cylinders may be assessed.

It wll be apparent that as the radioactive material is worn away so its level of radioactivity will fall. Thus by measuring the radioactive emission from the material, and making allowance for the natural decay, the amount of wear can be estimated. To eliminate small variations in radioactivity emitted with time, counts should preferably last for at least 15 minutes. Counts of such length may be made at regular intervals, for example, at intervals of 24 hours or longer. It has been found that reliable indications of wear rates can be obtained in as little as one week. Nevertheless, the method, as previously indicated, can be used over extended periods of one year or more.

Although the method is particularly suitable for large internal combustion engines, and more particularly for large diesel engines of either the trunk piston or cross head types, it can be used with any internal combustion engine. It may also have applicability to pumps, compressors, etc., which use pistons and cylinders and where the monitoring of wear is important.

The invention is illustrated by the following examples.

EXAMPLE 1

A 0.6 mm diameter hole was drilled into a piston ring of a Ruston 7X-HR engine to a depth of 1 mm, and the cleaned hole filled with Standard Araldite, as supplied by Ciba Geigy Limited. A piece of cobalt-60 wire 1 mm long and 0.5 mm in diameter, which had been activated to a level of 1 micro curie per millimeter was inserted into the hole, ensuring that the exposed end was flush with the surrounding material. On reassembling the engine, the piston ring was fitted with a peg to prevent rotation in the groove. A Nuclear Enterprises scintillation counter, with a 50 mm diameter thallium-activated sodium iodide crystal, was mounted outside the engine. The distance between the cobalt wire and the crystal was approximately 150 mm with 40 mm of this distance being metal or other radiation absorbing material. The engine was run for an extended period and the count rate from the detector was monitored continuously. From this information the estimated wear rate and the estimated amount of wear were calculated.

During a nineteen hour period the following results were obtained.

| | |
|---|---|
| Initial count rate | 314 500 counts/hour |
| Final count rate | 307 600 counts/hour |
| Background count rate | 14 400 counts/hour |
| Correction of natural decay | 84 counts/hour |

These results show that the fall in the count rate due to the amount of the cobalt wire which was worn away, allowing for background radiation and the natural decay of the cobalt-60 was 6816 counts/hour. This fall in count rate indicates that the length of the cobalt wire was reduced during the 19 hour test period by 22.71 μm, i.e. the rate of decrease was 1.19 μm/hour.

These results show that wear can be detected over a period of less than 24 hours.

The engine was run intermittently during a period of 53 days, testing the qualities of a variety of lubricants. Results over this period were:

| | |
|---|---|
| Initial count rate | 316 700 counts/hour |
| Final count rate | 156 200 counts/hour |
| Background count rate | 14 400 counts/hour |
| Correction for natural decay | 2 738 counts/hour |

These results show that the fall in the count rate due to the amount of the radioactive wire worn away, allowing for the background radiation and the natural decay of the cobalt-60 was 157 762 counts/hour. This fall in count rate indicates that the length of the cobalt wire was reduced during the test by 0.52 mm.

On dismantling the engine, the measured wear was 0.51 mm, confirming the accuracy of the method over an extended period.

EXAMPLE 2

A similar procedure to that described in Example 1 was carried out using an Abingdon AB-1 engine. For this test, the cobalt-60 wire was activated to the level of 2 micro curies per millimeter and inserted into a piston ring. The wear rates calculated from the detector count rates were again found to correlate well with the wear as measured when the test was stopped and the engine stripped down.

Table 1 shows the correlation between the amount of radial ring wear as measured using the cobalt wire and the loss of weight of the ring.

TABLE 1

| Measurement of Ring Wear in Abingdon AB-1 Engine | |
|---|---|
| Radial Ring Wear (mm) (cobalt wire method) | Ring Weight Loss (grammes) |
| .21 | 4.4 |
| .27 | 5.5 |
| .31 | 5.7 |
| .32 | 6.6 |
| .33 | 6.1 |
| .35 | 6.5 |
| .37 | 7.7 |
| .44 | 8.3 |
| .44 | 8.6 |

I claim:

1. A method of monitoring the wear of a contact surface between relatively moving parts comprising fixing a length of radioactive material into the part to be monitored so that one end of the material is flush with the wearing surface, the radioactive material having a hardness which is not greater than that of the material of the wearing surface into which it is fixed and measuring the loss of radioactivity as the surface of the part and radioactive material are worn away.

2. A method as claimed in claim 1 in which the radioactive material is capable of emitting radiation of sufficient energy to penetrate a thickness of metal of at least 5 mm, and be capable of measurement by a detector thereafter.

3. A method as claimed in claim 2 in which the radioactive material emits γ radiation.

4. A method as claimed in claim 1 in which the radioactive material is cobalt 60 wire.

5. A method as claimed in claim 4 in which the cobalt 60 wire is activated to between 1 and 20 micro curies per mm.

6. A method of monitoring the wear of relatively moving parts as claimed in claim 1 in which the relatively moving parts are parts of an internal combustion engine.

7. A method of monitoring the wear of relatively moving parts which are a piston ring and a cylinder wall or liner of an internal combustion engine comprising fixing a length of radioactive material into the part to be monitored so that one end of the material is flush with the wearing surface, the radioactive material having a hardness which is not greater than that of the material of the wearing surface into which it is fixed and measuring the loss of radioactivity as the surface of the part and radioactive material are worn away.

* * * * *